(12) United States Patent
Song et al.

(10) Patent No.: US 11,640,474 B2
(45) Date of Patent: May 2, 2023

(54) METHOD AND APPARATUS FOR OPERATING DATABASE

(71) Applicant: BEIJING BAIDU NETCOM SCIENCE AND TECHNOLOGY CO., LTD., Beijing (CN)

(72) Inventors: Hao Song, Beijing (CN); Baohua Lai, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 263 days.

(21) Appl. No.: 16/455,394

(22) Filed: Jun. 27, 2019

(65) Prior Publication Data

US 2020/0050782 A1 Feb. 13, 2020

(30) Foreign Application Priority Data

Aug. 8, 2018 (CN) .......................... 201810895459.0

(51) Int. Cl.
*G06F 21/00* (2013.01)
*G06F 21/62* (2013.01)
(Continued)

(52) U.S. Cl.
CPC .......... *G06F 21/6218* (2013.01); *G06F 21/33* (2013.01); *G06F 21/602* (2013.01)

(58) Field of Classification Search
CPC ..... G06F 21/6218; G06F 21/33; G06F 21/602
See application file for complete search history.

(56) References Cited

U.S. PATENT DOCUMENTS

2017/0109735 A1 4/2017 Sheng et al.
2018/0137512 A1* 5/2018 Georgiadis ............ H04L 9/3236
(Continued)

FOREIGN PATENT DOCUMENTS

CN 110365491 B * 3/2017 ......... G06F 21/6218
CN 107169371 A * 4/2017 ......... G06F 21/6218
(Continued)

OTHER PUBLICATIONS

CoinDesk, "A (Short) Guide to Blockchain Consensus Protocols", 2017, CoinDesk, pp. 1-7 (Year: 2017).*

*Primary Examiner* — Hosuk Song
*Assistant Examiner* — Chi D Nguy
(74) *Attorney, Agent, or Firm* — Seed IP Law Group LLP (57) ABSTRACT

Enclosed are a method and apparatus for operating a database. The method includes: performing, in response to determining a user indicated by a user identifier having a permission to operate on data targeted by a database operation statement, a digital signature on the database operation statement using a user private key to obtain signature information, generating transaction information according to the database operation statement, the signature information and the user identifier, and storing the generated transaction information into a local transaction information buffer pool; and selecting, in response to competing for a transaction information block recording permission using a preset consensus algorithm, transaction information in the local transaction information buffer pool to generate a block, parsing and executing a database operation statement in each piece of selected transaction information, concatenating the generated block to a local blockchain, and broadcasting the generated block to other database servers.

20 Claims, 6 Drawing Sheets

(51) Int. Cl.
*G06F 21/33* (2013.01)
*G06F 21/60* (2013.01)

(56) References Cited

U.S. PATENT DOCUMENTS

| | | | |
|---|---|---|---|
| 2018/0183768 A1* | 6/2018 | Lobban | H04L 63/0442 |
| 2019/0363889 A1* | 11/2019 | Wang | H04L 9/3247 |
| 2020/0004846 A1* | 1/2020 | Camenisch | H04L 9/3239 |
| 2020/0052880 A1* | 2/2020 | Bathen | H04L 9/14 |
| 2020/0379979 A1* | 12/2020 | Thekadath | H04L 29/08 |
| 2021/0133888 A1* | 5/2021 | Leise | G06F 16/2255 |

FOREIGN PATENT DOCUMENTS

| | | |
|---|---|---|
| CN | 107070938 A | 8/2017 |
| CN | 107423945 A | 12/2017 |
| CN | 107992356 A | 5/2018 |

* cited by examiner

METHOD AND APPARATUS FOR OPERATING DATABASE

CROSS-REFERENCE TO RELATED APPLICATIONS

This application claims priority to Chinese Patent Application No. 201810895459.0, filed on Aug. 8, 2018, titled "Method and apparatus for operating database," which is hereby incorporated by reference in its entirety.

TECHNICAL FIELD

Embodiments of the present disclosure relate to the field of computer technology, and specifically to a method and apparatus for operating a database.

BACKGROUND

A distributed database system (DDBS) contains a distributed database management system (DDBMS) and a distributed database (DDB). In the distributed database system, an application program may perform a transparent operation on the database. The data in the database is stored in different partial databases, is managed by different DBMSs, runs on different machines, is supported by different operating systems, and is connected together by different communication networks, respectively. One distributed database is logically a unified whole, and physically stored on different physical nodes. One application program may access databases distributed at different geographical locations through a network connection. Its distribution shows that the data in the database is not stored in the same place.

A traditional distributed database system is mainly applied in a centralized organization or company. Data is usually easily tampered with and cannot be effectively constrained, thus failing to meet the demands of an operational audit.

Moreover, all operation logs of a user in the traditional distributed database system are periodically archived and cleaned up, and the permissions of an existing distributed database system are generally in the hands of the system administrator of the centralized company or organization. It means that the information (including a user operation log, etc.) in the database system cannot be made open and transparent to ordinary users.

SUMMARY

Embodiments of the present disclosure propose a method and apparatus for operating a database.

In a first aspect, the embodiments of the present disclosure provide a method for operating a database, which is applied to a database server in a distributed database system. The method includes: in response to receiving a database operation request sent by a user using a terminal device, the database operation request including a database operation statement, a user identifier and a user private key, determining whether a user indicated by the user identifier has a permission to operate on data targeted by the database operation statement; performing, in response to determining the user having the permission, a digital signature on the database operation statement using the user private key to obtain signature information, generating transaction information according to the database operation statement, the signature information and the user identifier, and storing the generated transaction information into a local transaction information buffer pool; and selecting, in response to competing for a transaction information block recording permission using a preset consensus algorithm, transaction information in the local transaction information buffer pool to generate a block, parsing and executing a database operation statement in each piece of selected transaction information, concatenating the generated block to a local blockchain, and broadcasting the generated block to other database servers other than the database server in the distributed database system.

In some embodiments, the method further includes: in response to receiving a block sent by the other database servers in the distributed database system, querying, for each piece of transaction information recorded in the received block, a user public key of a user indicated by a user identifier in the transaction information in the distributed database system, and performing a signature verification on a database operation statement in the transaction information using the queried user public key and signature information in the transaction information; and concatenating, in response to the signature verification on the database operation statement in the each piece of transaction information recorded in the received block being successful, the received block to the local blockchain.

In some embodiments, the preset consensus algorithm is a Byzantine fault tolerance consensus algorithm.

In some embodiments, the distributed database system is a key-value distributed database system.

In a second aspect, the embodiments of the present disclosure provide an apparatus for operating a database, which is applied to a database server in a distributed database system. The apparatus includes: a permission determining unit, configured to, in response to receiving a database operation request sent by a user using a terminal device, the database operation request including a database operation statement, a user identifier and a user private key, determine whether a user indicated by the user identifier has a permission to operate on data targeted by the database operation statement; a signing and caching unit, configured to perform, in response to determining the user having the permission, a digital signature on the database operation statement using the user private key to obtain signature information, generate transaction information according to the database operation statement, the signature information and the user identifier, and store the generated transaction information into a local transaction information buffer pool; and a block generating and broadcasting unit, configured to select, in response to competing for a transaction information block recording permission using a preset consensus algorithm, transaction information in the local transaction information buffer pool to generate a block, parse and execute a database operation statement in each piece of selected transaction information, concatenate the generated block to a local blockchain, and broadcast the generated block to other database servers other than the database server in the distributed database system.

In some embodiments, the apparatus further includes: a block verifying unit, configured to, in response to receiving a block sent by the other database servers in the distributed database system, query, for each piece of transaction information recorded in the received block, a user public key of a user indicated by a user identifier in the transaction information in the distributed database system, and perform a signature verification on a database operation statement in the transaction information using the queried user public key and signature information in the transaction information; and a block concatenating unit, configured to concatenate, in response to the signature verification on the database operation statement in the each piece of transaction information recorded in the received block being successful, the received block to the local blockchain.

In some embodiments, the preset consensus algorithm is a Byzantine fault tolerance consensus algorithm.

In some embodiments, the distributed database system is a key-value distributed database system.

In a third aspect, the embodiments of the present disclosure provide a database server. The database server includes: one or more processors; and a storage device, configured to store one or more programs. The one or more programs, when executed by the one or more processors, cause the one or more processors to implement the method described in any implementation in the first aspect.

In a fourth aspect, the embodiments of the present disclosure provide a computer readable storage medium storing a computer program. The computer program, when executed by one or more processors, implements the method described in any implementation in the first aspect.

In a fifth aspect, the embodiments of the present disclosure provide a distributed database system, including at least one database server as described in the third aspect.

According to the method and apparatus for operating a database provided by the embodiments of the present disclosure, a permission check is performed on the database operation request, the transaction information is generated according to the database operation request in the situation where the permission check is successful, and the transaction information is stored into the local transaction information buffer pool. In addition, in the situation of competing for the transaction information block recording permission, the transaction information is selected in the local transaction information buffer pool to generate the block, the database operation statement in the each piece of selected transaction information is parsed and executed, the generated block is concatenated to the local blockchain, and the generated block is broadcasted to the other database servers other than the database server in the distributed database system. Therefore, the blockchain technology is effectively utilized, and the tamper resistance of the distributed database system and the traceability of the data are realized, so that the existing distributed database has the characteristics of the audit, and fair and transparent, and has the characteristic of being compatible with the access to the SQL (Structured Query Language) in a traditional database.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
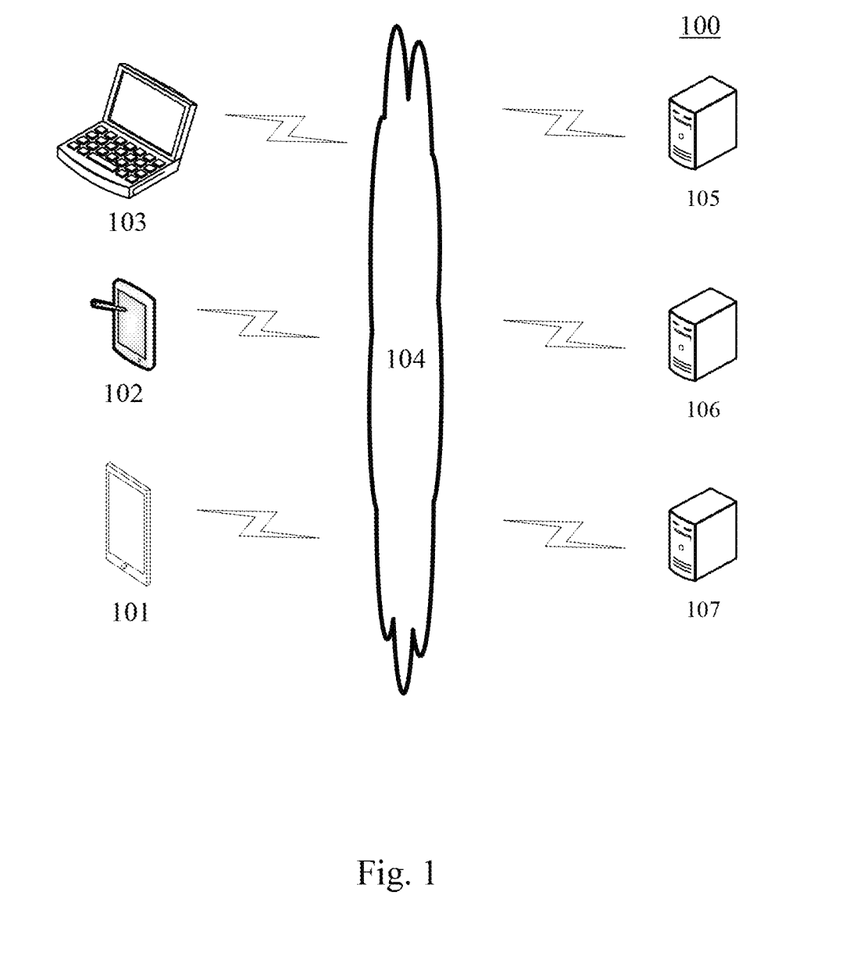
FIG. 1 is a diagram of an exemplary system architecture in which an embodiment of the present disclosure may be applied.

FIG. 1 shows an exemplary system architecture 100 in which an embodiment of a method for operating a database or an apparatus for operating a database according to the present disclosure may be applied.

As shown in FIG. 1, the system architecture 100 may include terminal devices 101, 102 and 103, a network 104, and database servers 105, 106 and 107. The network 104 serves as a medium providing a communication link between the terminal devices 101, 102 and 103 and the database servers 105, 106 and 107. The network 104 may include various types of connections, for example, wired or wireless communication links, or optical fiber cables.

A user may interact with the database servers 105, 106 and 107 via the network 104 using the terminal devices 101, 102 and 103, to receive or send messages. Various communication client applications (e.g., distributed database client applications, shopping applications, search applications, instant communication tools, mailbox clients and social platform software) may be installed on the terminal devices 101, 102 and 103.

The terminal devices 101, 102 and 103 maybe hardware or software.

When being the hardware, the terminal devices 101, 102 and 103 may be various electronic devices having a display screen, which include, but not limited to, a smart phone, a tablet computer, a laptop portable computer, a desktop computer, etc. When being the software, the terminal devices 101, 102 and 103 may be installed in the above listed electronic devices. The terminal devices may be implemented as a plurality of pieces of software or a plurality of software modules (e.g., software or software modules for providing a distributed database service), or as a single piece of software or a single software module, which will not be specifically defined here.

The database servers 105, 106 and 107 may constitute a distributed database system, and the database servers 105, 106 and 107 may provide a support for the distributed database client applications displayed on the terminal devices 101, 102 and 103.

For example, the database servers 105, 106 and 107 may process (e.g., analyze) data such as a received database operation request, and feed back the processing result (e.g., query result data or operation result data) to the terminal devices.

It should be noted that the method for operating a database provided by the embodiments of the present disclosure is generally performed by the database servers 105, 106 and 107. Correspondingly, the apparatus for operating a database is generally provided in the database servers 105, 106 and 107.

It should be noted that the database servers 105, 106 and 107 may be hardware or software. When being the hardware, the database servers 105, 106 and 107 may be implemented as a distributed database server cluster composed of a plurality of servers, or as a single server. When being the software, the database servers 105, 106 and 107 may be implemented as a plurality of pieces of software or a plurality of software modules (e.g., software or software modules for providing a distributed database service), or as a single piece of software or a single software module, which will not be specifically defined here.

It should be appreciated that the numbers of the terminal devices, the networks, and the database servers in FIG. 1 are merely illustrative. Any number of terminal devices, networks, and database servers may be provided based on actual requirements.

Figure 2:
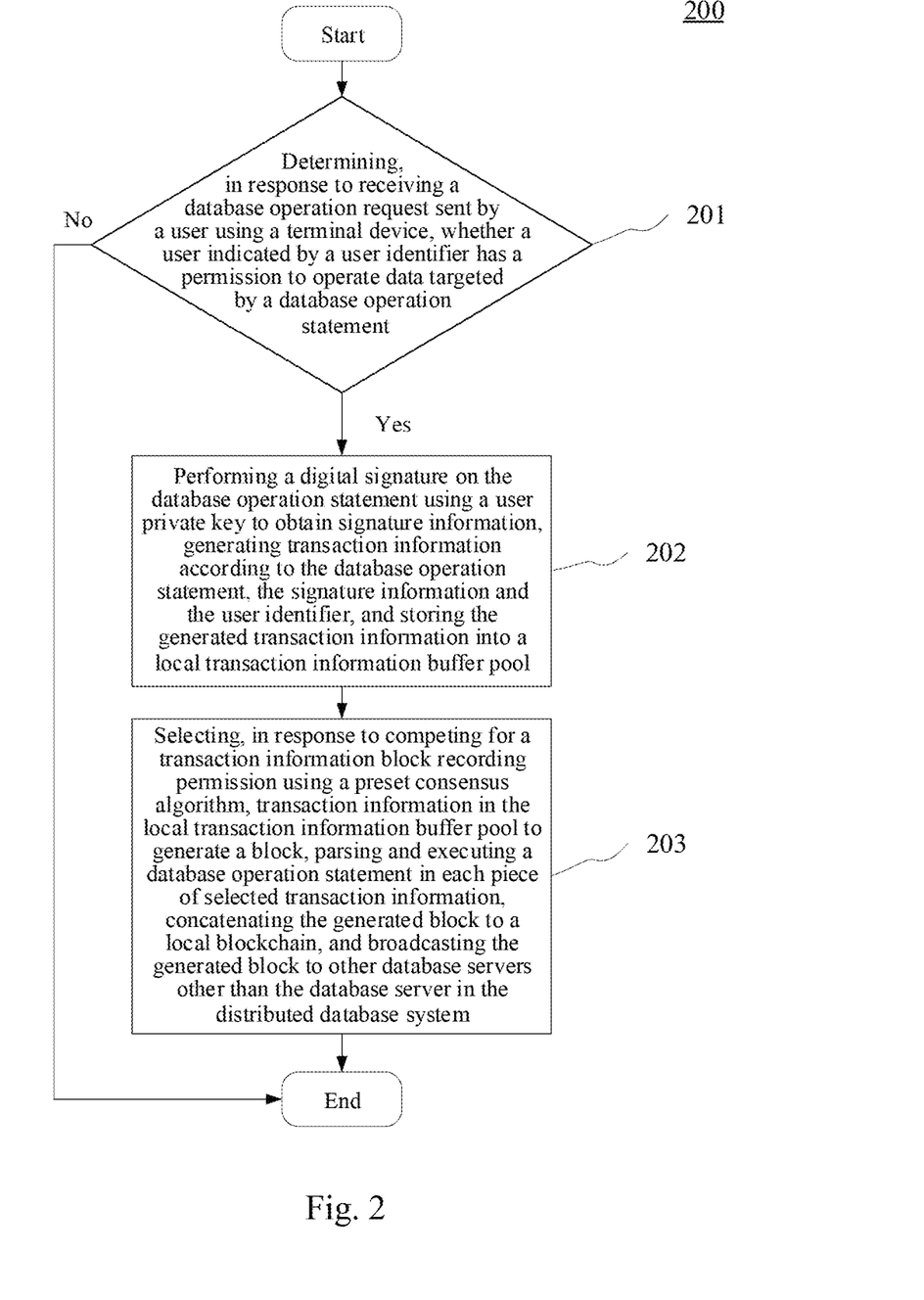
FIG. 2 is a flowchart of an embodiment of a method for operating a database according to the present disclosure.

Further referring to FIG. 2, FIG. 2 illustrates a flow 200 of an embodiment of a method for operating a database according to the present disclosure. The method for operating a database is applied to a database server in a distributed database system, and includes the following steps.

Step 201, determining, in response to receiving a database operation request sent by a user using a terminal device, whether a user indicated by a user identifier has a permission to operate data targeted by a database operation statement.

In this embodiment, in the situation where the database operation request sent by the user using the terminal device is received by means of a wired connection or a wireless connection, the database operation request including the database operation statement, the user identifier and a user private key, an executing body (e.g., the database server shown in FIG. 1) of the method for operating a database may first parse the database operation statement in the database operation request, to determine the data targeted by the database operation statement. Then, the executing body may determine whether the user indicated by the user identifier in the database operation request has the permission to operate the data targeted by the database operation statement in the database operation request. If it is determined that the user has the permission, the flow turns to step 202. If it is determined that the user does not have the permission, the flow is ended.

Here, the method of parsing the database operation statement is an existing technique widely studied and applied at present, which will not be repeatedly described here. For example, the database operation statement maybe an SQL statement, and the SQL statement may be parsed using an existing SQL parsing engine.

Here, the user identifier is used to uniquely identify the user in the distributed database system, and the user identifier may include at least one of: a number, a letter or a text. The user identifier may be a user name inputted by the user. The user identifier may also be acquired by the user when registering in a blockchain account generation application.

In this embodiment, each user identifier corresponds to a respective user public key and a respective user private key. Here, the user identifier and the user public key are correspondingly stored in the distributed database system, and the user private key is saved and maintained by the user himself, and not stored in the distributed database system. The user public key and the user private key of the each user form a key pair, which may be used for an asymmetric encryption and decryption.

Here, the user private key may be a user key inputted by the user when registering the so-called distributed database system. The user private key may also be a private key acquired by the user when registering in the blockchain account generation application. For example, the blockchain account generation application may generate the user identifier, the user public key and the user private key using the following steps.

In the first step, random information is generated to be used as the user private key.

In the second step, an encryption is performed on the user private key using an elliptic curve encryption algorithm to obtain the user public key.

In the third step, a hash value of the user public key is calculated to be used as a first hash value. For example, an SHA256 or RIPEMD160 hash algorithm may be used.

In the fourth step, SHA256 hash is performed on the first hash value twice to obtain a second hash value, and the first four bytes in the second hash value are used as a check value.

In the fifth step, a preset identifier prefix of one byte, the first hash value and the check value are spliced to obtain an intermediate user identifier.

In the sixth step, an encoding conversion is performed on an intermediate address using BASE58 encoding, to obtain the user identifier.

Step 202, performing a digital signature on the database operation statement using a user private key to obtain signature information, generating transaction information according to the database operation statement, the signature information and the user identifier, and storing the generated transaction information into a local transaction information buffer pool.

In this embodiment, in the situation where it is determined in step 201 that the user indicated by the user identifier in the database operation request has the permission to operate the data targeted by the database operation statement in the database operation request, the executing body (e.g., the database server shown in FIG. 1) may first perform the digital signature on the database operation statement using the user private key in the database operation request, to obtain the signature information. Then, the transaction information is generated according to the database operation statement, the signature information and the user identifier. Finally, the generated transaction information is stored into the local transaction information buffer pool.

Here, the executing body may first generate digest information of the database operation statement using a preset message digest algorithm. Then, an encryption may be performed on the generated digest information using a preset digital signature algorithm, to obtain the signature information. Here, the preset digital signature algorithm may include, but not limited to, an RSA digital signature algorithm, an ElGamal digital signature algorithm, a Fiat-Shamir digital signature algorithm, a Guillou-Quistquarter digital signature algorithm, a Schnorr digital signature algorithm, an Ong-Schnorr-Shamir digital signature algorithm, Des/DSA, an elliptic curve digital signature algorithm, a finite automaton digital signature algorithm, and various digital signature algorithms developed in the future.

Here, the executing body may generate the transaction information according to the database operation statement, the signature information and the user identifier using various implementations. For example, the executing body may directly generate the transaction information using the database operation statement, the signature information and the user identifier. As another example, the executing body may generate the transaction information using the database operation statement, the signature information, the user identifier and the time stamp of the time when the executing body receives the database operation request.

Here, the executing body may locally store the transaction information buffer pool, and the transaction information stored in the transaction information buffer pool is transaction information that is not processed. If the transaction information is selected and a block is generated, the selected transaction information will be removed from the transaction information buffer pool.

Step 203, selecting, in response to competing for a transaction information block recording permission using a preset consensus algorithm, transaction information in the local transaction information buffer pool to generate a block, parsing and executing a database operation statement in each piece of selected transaction information, concatenating the generated block to a local blockchain, and broadcasting the generated block to other database servers other than the database server in the distributed database system.

In this embodiment, the executing body of the method for operating a database may compete for the recording permission of a transaction information block using the preset consensus algorithm at any time. In addition, in the situation of competing for the recording permission of the transaction information block, the executing body may first select the transaction information in the local transaction information buffer pool to generate the block. Then, the database operation statement in the each piece of selected transaction information is parsed and executed. Next, the generated block is concatenated to the local blockchain. Finally, the generated block is broadcasted to the other database servers other than the database server in the distributed database system.

Here, the executing body may select the transaction information in the local transaction information buffer pool by various means. For example, when the transaction information includes a timestamp, the executing body may select the transaction information in a chronological order of the timestamp in the transaction information. The executing body first selects the earlier transaction information, and then selects the later transaction information. As another example, the executing body may further select the transaction information according to the operation type of the operation indicated by the database operation statement. For example, the transaction information corresponding to a querying operation is first selected. Then, the transaction information corresponding to an adding operation is selected. Next, the transaction information corresponding to a modifying operation is selected. Finally, the transaction information corresponding to a removing operation is selected. It may be understood that, in practice, the size of the transaction information block is usually restricted to being less than a preset capacity, for example, less than 1 megabyte, or less than 2 megabytes. Thus, the number of pieces of the selected transaction information may be defined here, to ensure that the requirement that the size of the transaction information block is less than the preset capacity is fulfilled.

After the transaction information is selected, the selected transaction information may be generated into the block. Here, how to generate the block is an existing technique widely studied and applied at present, which will not be repeatedly described here. For example, a Merkle tree technique may first be used to generate the Merkle tree of the each piece of selected transaction information to be used as block body data. Then, the hash value of a previous block, a random number generated randomly, the each piece of selected transaction information and the tree root of the generated Merkle tree are used to generate block head data. Finally, the block head data and the block body data are combined to obtain the block. Clearly, optionally, the block head may further include the timestamp of the time when the block is generated.

Here, the preset consensus algorithm may be a consensus algorithm for selecting a database server in various database servers of the distributed database system as a database server competing for the transaction information block recording permission of the currently to-be-written data of the blockchain. For example, the preset consensus algorithm may be PoW (Proof of Work), PoS (Proof of Stake), DPOS (Delegated Proof of Stake), and the like.

Optionally, since the distributed database system is operated by a designated organization or company in most cases, a PBFT (practical Byzantine fault tolerance) consensus algorithm may be used as the preset consensus algorithm here, and the blockchain formed by the various database servers in the distributed database system may further be a consortium chain. In practice, since a key-value database is more suitable for a distributed database, the distributed database system here may be a key-value distributed database system.

In the method provided by the above embodiment of the present disclosure, the blockchain is introduced into the distributed database system. In addition, the blockchain is a decentralized distributed ledger, and the recorded information may be effectively prevented from being tampered with through the encryption algorithm and the consensus mechanism, to make the information traceable. Thus, realizing the tamper resistance, traceability and the openness and transparency of the distributed database system.

Figure 3:
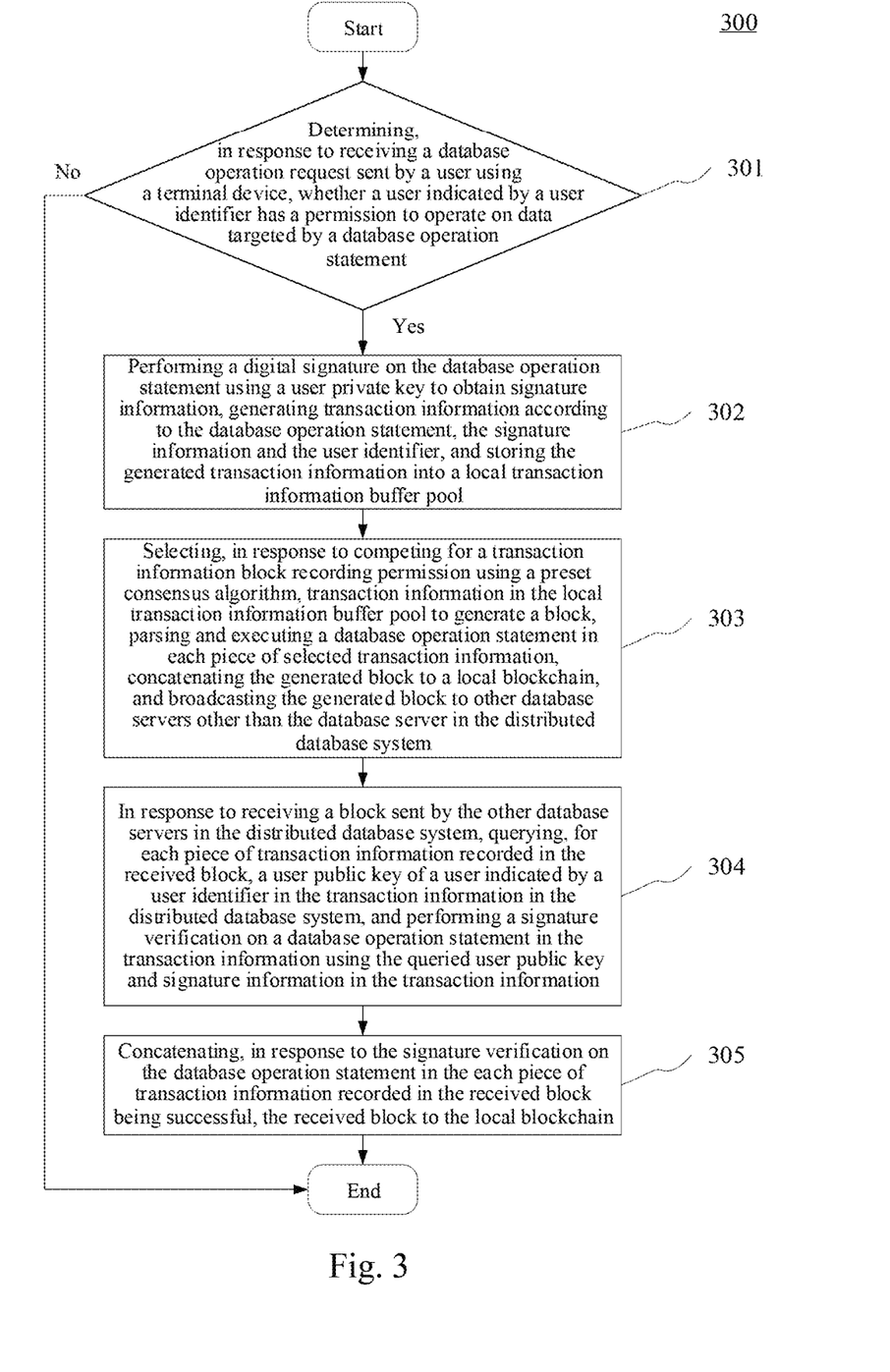
FIG. 3 is a flowchart of another embodiment of the method for operating a database according to the present disclosure.

Further referring to FIG. 3, FIG. 3 illustrates a flow 300 of another embodiment of the method for operating a database. The flow 300 of the method for operating a database is applied to a database server in a distributed database system, and includes the following steps.

Step 301, determining, in response to receiving a database operation request sent by a user using a terminal device, whether a user indicated by a user identifier has a permission to operate on data targeted by a database operation statement.

Step 302, performing a digital signature on the database operation statement using a user private key to obtain signature information, generating transaction information according to the database operation statement, the signature information and the user identifier, and storing the generated transaction information into a local transaction information buffer pool.

Step 303, selecting, in response to competing for a transaction information block recording permission using a preset consensus algorithm, transaction information in the local transaction information buffer pool to generate a block, parsing and executing a database operation statement in each piece of selected transaction information, concatenating the generated block to a local blockchain, and broadcasting the generated block to other database servers other than the database server in the distributed database system.

The specific operations in steps 301, 302 and 303 in this embodiment are basically the same as that in steps 201, 202 and 203, which will not be repeatedly described here.

Step 304, in response to receiving a block sent by the other database servers in the distributed database system, querying, for each piece of transaction information recorded in the received block, a user public key of a user indicated by a user identifier in the transaction information in the distributed database system, and performing a signature verification on a database operation statement in the transaction information using the queried user public key and signature information in the transaction information.

In this embodiment, in addition to concatenating the generated block to the local blockchain and broadcasting the generated block to the other database servers other than the database server in the distributed database system, the executing body (e.g., the database server shown in FIG. 1) of the method for operating a database, as the database server in the distributed database system, may further receive the block sent by the other database servers other than the database server in the distributed database system at the same time. In this way, in the situation where the block sent by the other database servers in the distributed database system is received, for the each piece of transaction information recorded in the received block, the executing body may first query, in the distributed database system, the user public key of the user indicated by the user identifier in the transaction information. Then, the executing body may perform a decryption on the signature information in the transaction information using the queried public key by adopting a preset digital signature algorithm, to obtain digest information after the decryption. Next, the executing body may generate digest information of the database operation statement in the transaction information using a preset message digest algorithm. Finally, if the digest information after the decryption is identical to the generated digest information, the executing body may determine that the signature verification on the transaction information is successful.

Step 305, concatenating, in response to the signature verification on the database operation statement in the each piece of transaction information recorded in the received block being successful, the received block to the local blockchain.

In this embodiment, in the situation where the signature verification on the database operation statement in the each piece of transaction information recorded in received block is successful, the executing body may concatenate the received block to the local blockchain, and thus, each database server in the distributed database system saves the same blockchain data.

It may be seen from FIG. 3 that, as compared with the embodiment corresponding to FIG. 2, the flow 300 of the method for operating a database in this embodiment emphasizes the step of performing the signature verification on the transaction information recorded in the block received from the other database servers. Thus, the scheme described in this embodiment may implement the verification and synchronization of the blockchain data, thereby further improving the security of the distributed database system.

Figure 4:
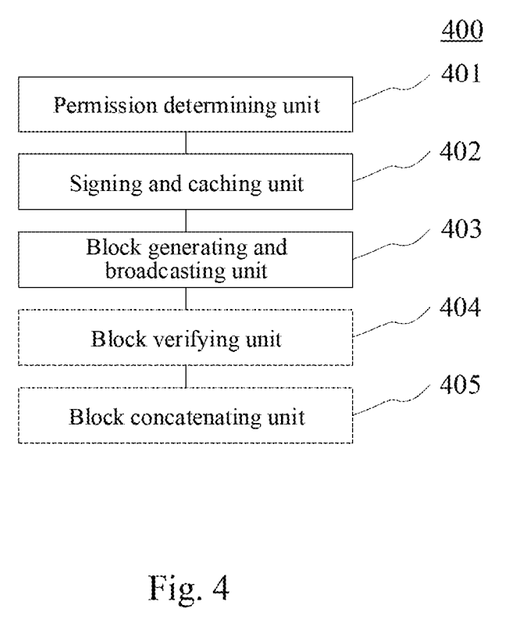
FIG. 4 is a schematic structural diagram of an embodiment of an apparatus for operating a database according to the present disclosure.

Further referring to FIG. 4, as an implementation of the method shown in the above drawings, the present disclosure provides an embodiment of an apparatus for operating a database, which is applied to a database server in a distributed database system. The embodiment of the apparatus corresponds to the embodiment of the method shown in FIG. 2, and the apparatus may be applied in various electronic devices.

As shown in FIG. 4, the apparatus 400 for operating a database in this embodiment includes: a permission determining unit 401, a signing and caching unit 402 and a block generating and broadcasting unit 403. The permission determining unit 401 is configured to, in response to receiving a database operation request sent by a user using a terminal device, the database operation request including a database operation statement, a user identifier and a user private key, determine whether a user indicated by the user identifier has a permission to operate on data targeted by the database operation statement. The signing and caching unit 402 is configured to perform, in response to determining the user having the permission, a digital signature on the database operation statement using the user private key to obtain signature information, generate transaction information according to the database operation statement, the signature information and the user identifier, and store the generated transaction information into a local transaction information buffer pool. The block generating and broadcasting unit 403 is configured to select, in response to competing for a transaction information block recording permission using a preset consensus algorithm, transaction information in the local transaction information buffer pool to generate a block, parse and execute a database operation statement in each piece of selected transaction information, concatenate the generated block to a local blockchain, and broadcast the generated block to other database servers other than the database server in the distributed database system.

In this embodiment, for specific processes of the permission determining unit 401, the signing and caching unit 402 and the block generating and broadcasting unit 403 in the apparatus 400 for operating a database, and their technical effects, reference may be made to relative descriptions of step 201, step 202 and step 203 in the corresponding embodiment of FIG. 2 respectively, which will not be repeatedly described here.

In some optional implementations of this embodiment, the apparatus 400 may further include: a block verifying unit 404, configured to, in response to receiving a block sent by the other database servers in the distributed database system, query, for each piece of transaction information recorded in the received block, a user public key of a user indicated by a user identifier in the transaction information in the distributed database system, and perform a signature verification on a database operation statement in the transaction information using the queried user public key and signature information in the transaction information; and a block concatenating unit 405, configured to concatenate, in response to the signature verification on the database operation statement in the each piece of transaction information recorded in the received block being successful, the received block to the local blockchain.

In some optional implementations of this embodiment, the preset consensus algorithm may be a Byzantine fault tolerance consensus algorithm.

In some optional implementations of this embodiment, the distributed database system may be a key-value distributed database system.

It should be noted that, for the implementation details and technical effects of the units in the apparatus for operating a database provided by the embodiment of the present disclosure, reference may be made to the descriptions for other embodiments in the present disclosure, which will not be repeatedly described here.

Figure 5:
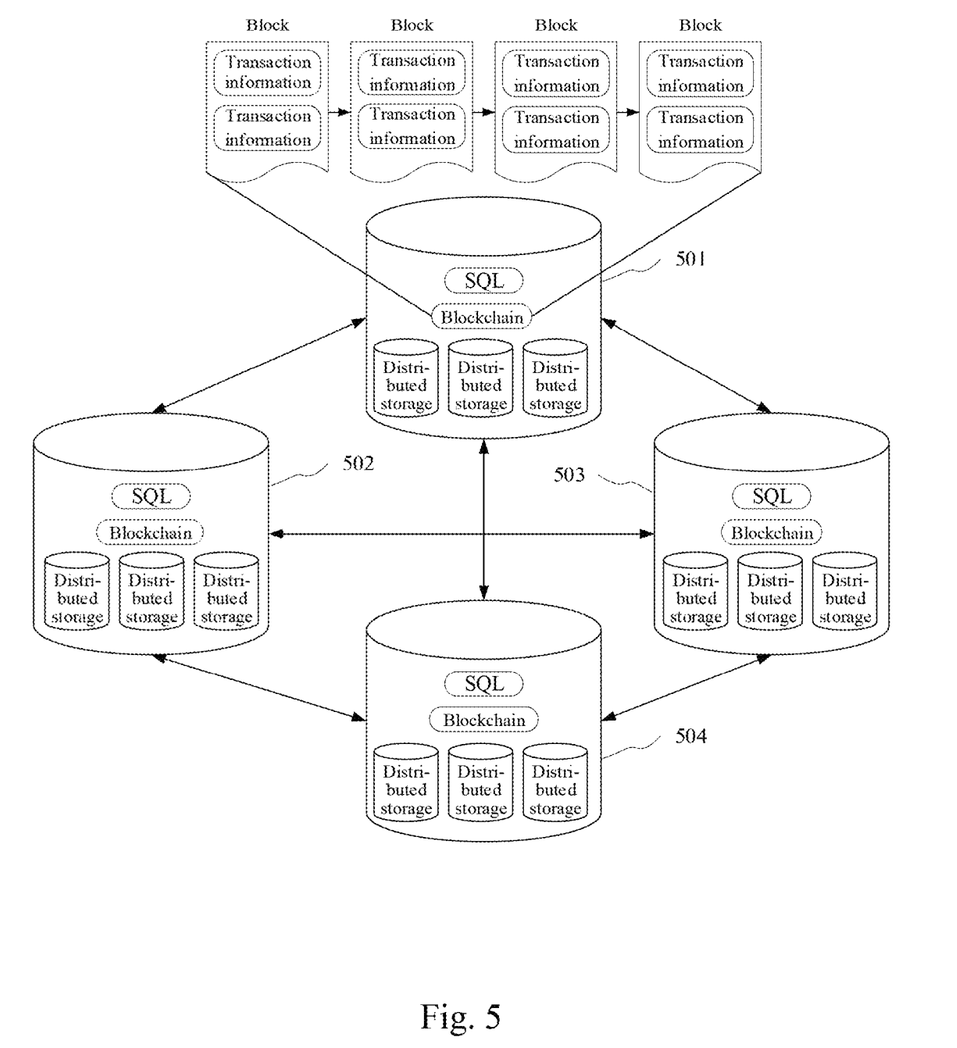
FIG. 5 is a schematic structural diagram of an embodiment of a distributed database system according to the present disclosure.

Further referring to FIG. 5, FIG. 5 is a schematic structural diagram of an embodiment of a distributed database system according to the present disclosure. In FIG. 5, the distributed database system includes database servers 501, 502, 503 and 504. The database servers 501, 502, 503 and 504 constitute a peer-to-peer network, and each distributed database server may include three parts: a SQL engine, a blockchain and a distributed storage. Here, the SQL engine is responsible for parsing and executing a database operation statement. The blockchain is composed of a plurality of blocks connected in a chain, and each block stores at least one piece of transaction information. The transaction information includes a database operation statement received by the distributed database system, on which the check verification performed by the distributed database system is successful and which is executed by the distributed database system, and the user identifier corresponding to the database operation statement. The distributed storage stores the data in a distributed database. An identical blockchain is stored in the blockchains in database servers 501, 502, 503 and 504, and the blockchains in the database servers 501, 502, 503 and 504 form a blockchain system. It should be understood that the number of the database servers in FIG. 5 is merely illustrative. Any number of database servers may be provided based on actual requirements.

Figure 6:
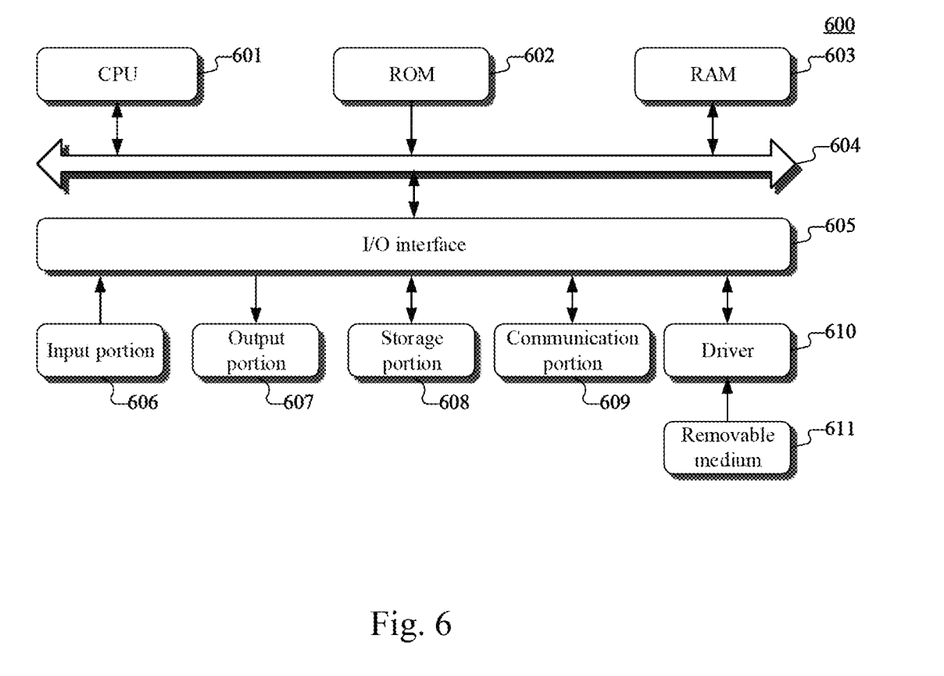
FIG. 6 is a schematic structural diagram of a computer system adapted to implement a database server according to the embodiments of the present disclosure.

Referring to FIG. 6, FIG. 6 is a schematic structural diagram of a computer system 600 adapted to implement a database server of the embodiments of the present disclosure. The database server shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker etc.; a storage portion 608 including a hard disk and the like; and a communication portion 609 including a network interface card such as a LAN (local area network) card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the system of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above.

In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flowcharts as well as a combination of blocks maybe implemented using a dedicated hardware-based system executing specified functions or operations, or by a combination of dedicated hardware and computer instructions.

The units involved in the embodiments of the present disclosure maybe implemented by means of software or hardware. The described units may also be provided in a processor. For example, the processor may be described as: a processor comprising a permission determining unit, a signing and caching unit and a block generating and broadcasting unit. The names of these units do not in some cases constitute a limitation to such units themselves. For example, the permission determining unit may also be described as "a unit for determining whether a user has a permission to operate on a database."

In another aspect, the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: in response to receiving a database operation request sent by a user using a terminal device, the database operation request including a database operation statement, a user identifier and a user private key, determine whether a user indicated by the user identifier has a permission to operate on data targeted by the database operation statement; perform, in response to determining the user having the permission, a digital signature on the database operation statement using the user private key to obtain signature information, generate transaction information according to the database operation statement, the signature information and the user identifier, and store the generated transaction information into a local transaction information buffer pool; and select, in response to competing for a transaction information block recording permission using a preset consensus algorithm, transaction information in the local transaction information buffer pool to generate a block, parse and execute a database operation statement in each piece of selected transaction information, concatenate the generated block to a local blockchain, and broadcast the generated block to other database servers other than the database server in the distributed database system.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A method for operating a database, applied to a database server in a distributed database system, the distributed database system comprising database servers, each of the database servers including a Structured Query Language (SQL) engine, a block chain, and a distributed storage, data in the database is distributed in distributed storages of the database servers, the database servers storing identical blockchains, and the blockchains stored in the database servers form a blockchain system, the method comprising:

in response to receiving a database operation request sent by a user using a terminal device, the database operation request comprising a SQL statement, a user identifier and a user private key, determining whether a user indicated by the user identifier has a permission to operate data targeted by the SQL statement, wherein an operation indicated by the SQL statement refers to performing a querying operation, an adding operation, a modifying operation, or a deleting operation on the data targeted by the parsed SQL statement in the database;

performing, in response to determining the user having the permission, a digital signature on the SQL statement using the user private key to obtain signature information of the SQL statement, generating transaction information according to the SQL statement, the signature information of the SQL statement and the user identifier, and storing the generated transaction information into a local transaction information buffer pool; and in response to competing for a transaction information block recording permission using a preset consensus algorithm, selecting at least two pieces of transaction information from the local transaction information buffer pool to generate a block, parsing, by the SQL statement engine in the database server, a SQL statement in each piece of selected transaction information and executing an operation indicated by the parsed SQL statement after the block is generated, wherein the executing the operation indicated by the parsed SQL statement refers to performing the querying operation, the adding operation, the modifying operation, or the deleting operation on data targeted by the parsed SQL statement in the database, concatenating the generated block to the local blockchain, and broadcasting the generated block to other database servers in the distributed database system, for the other database servers to verify SQL statements in the at least two pieces of transaction information in the generated block and to concatenate the generated block to the blockchains of the other database servers.

2. The method according to claim 1, further comprising: in response to receiving a block sent by the other database servers in the distributed database system, querying, for each piece of transaction information recorded in the received block, a user public key of a user indicated by a user identifier in the transaction information in the distributed database system, and performing a signature verification on a SQL statement in the transaction information using the queried user public key and signature information in the transaction information; and concatenating, in response to the signature verification on the SQL statement in the each piece of transaction information recorded in the received block being successful, the received block to the local blockchain.

3. The method according to claim 2, wherein the preset consensus algorithm is a Byzantine fault tolerance consensus algorithm.

4. The method according to claim 3, wherein the distributed database system is a key-value distributed database system.

5. The method according to claim 1, wherein the blockchain is composed of a plurality of blocks connected in a chain, and each block stores pieces of transaction information.

6. The method according to claim 1, wherein the selecting transaction information in the local transaction information buffer pool to generate a block, includes:
- generating a Merkle tree of each piece of selected transaction information, and using the generated Merkle tree as block body data;
- generating block head data using the each piece of selected transaction information and a tree root of the generated Merkle tree; and
- obtaining the block by combining the block head data and the block body data.

7. The method according to claim 1, wherein the selecting at least two pieces of transaction information from the local transaction information buffer pool to generate a block, comprises:
- selecting, according to operation types of operations indicated by SQL statements included in the at least two pieces of transaction information, the at least two pieces of transaction information from the local transaction information buffer pool to generate the block.

8. The method according to claim 7, wherein the selecting at least two pieces of transaction information from the local transaction information buffer pool according to operation types of operations indicated by SQL statements included in the at least two pieces of transaction information to generate a block, comprises:
- selecting, according to a preset order of the operation types, the at least two pieces of transaction information from the local transaction information buffer pool, wherein the preset order of the operation types refers to: the querying operation, adding operation, modifying operation, and removing operation.

9. The method according to claim 7, wherein the selecting at least two pieces of transaction information from the local transaction information buffer pool according to operation types of operations indicated by SQL statements included in the at least two pieces of transaction information to generate a block, comprises:
- transaction information corresponding to a querying operation is first selected, transaction information corresponding to an adding operation is secondly selected, transaction information corresponding to a modifying operation is thirdly selected, the transaction information corresponding to a removing operation is finally selected.

10. The method according to claim 1, the selecting at least two pieces of transaction information from the local transaction information buffer pool to generate a block, comprises:
- selecting a number of pieces of transaction information to fulfill that a size of a block generated based on the number of pieces of transaction information is less than a preset capacity.

11. An apparatus for operating a database, applied to a database server in a distributed database system, the distributed database system comprising database servers, each of the database servers including a Structured Query Language (SQL) engine, a block chain, and a distributed storage, data in the database is distributed in distributed storages of the database servers, the database servers storing identical blockchains, and the blockchains stored in the database servers form a blockchain system, the apparatus comprising:
- at least one processor; and
- a memory storing instructions, wherein the instructions when executed by the at least one processor, cause the at least one processor to perform operations, the operations comprising:
  - in response to receiving a database operation request sent by a user using a terminal device, the database operation request comprising a SQL statement, a user identifier and a user private key, determining whether a user indicated by the user identifier has a permission to operate data targeted by the SQL statement, wherein an operation indicated by the SQL statement refers to performing a querying operation, an adding operation, a modifying operation, or a deleting operation on the data targeted by the parsed SQL statement in the database;
  - performing, in response to determining the user having the permission, a digital signature on the SQL statement using the user private key to obtain signature information of the SQL statement, generating transaction information according to the SQL statement, the signature information of the SQL statement and the user identifier, and storing the generated transaction information into a local transaction information buffer pool; and
  - in response to competing for a transaction information block recording permission using a preset consensus algorithm, selecting at least two pieces of transaction information from the local transaction information buffer pool to generate a block, parsing, by the SQL engine in the database server, a SQL statement in each piece of selected transaction information, and executing an operation indicated by the parsed SQL statement after the block is generated, wherein the executing the operation indicated by the parsed SQL statement refers to performing the querying operation, the adding operation, the modifying operation, or the deleting operation on data targeted by the parsed SQL statement in the database, concatenating the generated block to the local blockchain, and broadcasting the generated block to other database servers in the distributed database system, for the other database servers to verify SQL statements in the at least two pieces of transaction information in the generated block and to concatenate the generated block to the blockchains of the other database servers.

12. The apparatus according to claim 11, wherein the operations further comprise:
- in response to receiving a block sent by the other database servers in the distributed database system, querying, for each piece of transaction information recorded in the received block, a user public key of a user indicated by a user identifier in the transaction information in the distributed database system, and performing a signature verification on a SQL statement in the transaction information using the queried user public key and signature information in the transaction information; and
- concatenating, in response to the signature verification on the SQL statement in the each piece of transaction information recorded in the received block being successful, the received block to the local blockchain.

13. The apparatus according to claim 12, wherein the preset consensus algorithm is a Byzantine fault tolerance consensus algorithm.

14. The apparatus according to claim 13, wherein the distributed database system is a key-value distributed database system.

15. A database server, comprising:
- one or more processors; and
- a storage device, configured to store one or more programs, wherein the one or more programs, when executed by the one or more processors, cause the one or more processors to perform operations, the operations comprising:

in response to receiving a database operation request sent by a user using a terminal device, the database operation request comprising a Structured Query Language (SQL) statement, a user identifier and a user private key, determining whether a user indicated by the user identifier has a permission to operate data targeted by the SQL statement, wherein an operation indicated by the SQL statement refers to performing a querying operation, an adding operation, a modifying operation, or a deleting operation on the data targeted by the parsed SQL statement in the database;

performing, in response to determining the user having the permission, a digital signature on the SQL statement using the user private key to obtain signature information of the SQL statement, generating transaction information according to the SQL statement, the signature information of the SQL statement and the user identifier, and storing the generated transaction information into a local transaction information buffer pool; and in response to competing for a transaction information block recording permission using a preset consensus algorithm, selecting transaction information in the local transaction information buffer pool to generate a block, parsing, by a SQL engine, a SQL statement in each piece of selected transaction information and executing an operation indicated by the parsed SQL statement after the block is generated, wherein the executing the operation indicated by the parsed SQL statement refers to performing the querying operation, the adding operation, the modifying operation, or the deleting operation on data targeted by the parsed SQL statement in the database, concatenating the generated block to a local blockchain, and broadcasting the generated block to other database servers in a distributed database system, for the other database servers to verify SQL statements in the at least two pieces of transaction information in the generated block and to concatenate the generated block to the blockchains of the other database servers, wherein the distributed database system comprising database servers, each of the database servers including a SQL engine, a block chain, and a distributed storage, data in the database is distributed in distributed storages of the database servers, the database servers storing identical blockchains, and the blockchains stored in the database servers form a blockchain system.

16. A non-transitory computer readable medium, storing a computer program, wherein the program, when executed by a processor, implements operations comprising:

in response to receiving a database operation request sent by a user using a terminal device, the database operation request comprising a Structured Query Language (SQL) statement, a user identifier and a user private key, determining whether a user indicated by the user identifier has a permission to operate data targeted by the SQL statement, wherein an operation indicated by the SQL statement refers to performing a querying operation, an adding operation, a modifying operation, or a deleting operation on the data targeted by the parsed SQL statement in the database;

performing, in response to determining the user having the permission, a digital signature on the SQL statement using the user private key to obtain signature information of the SQL statement, generating transaction information according to the SQL statement, the signature information of the SQL statement and the user identifier, and storing the generated transaction information into a local transaction information buffer pool; and in response to competing for a transaction information block recording permission using a preset consensus algorithm, selecting at least two pieces of transaction information from the local transaction information buffer pool to generate a block, parsing, by a SQL engine, a SQL statement in each piece of selected transaction information and executing an operation indicated by the parsed SQL statement after the block is generated, wherein the executing the operation indicated by the parsed SQL statement refers to performing the querying operation, the adding operation, the modifying operation, or the deleting operation on data targeted by the parsed SQL statement in the database, concatenating the generated block to a local blockchain, and broadcasting the generated block to other database servers in a distributed database system, for the other database servers to verify SQL statements in the at least two pieces of transaction information in the generated block and to concatenate the generated block to the blockchains of the other database servers, wherein the distributed database system comprising database servers, each of the database servers including a SQL engine, a block chain, and a distributed storage, data in the database is distributed in distributed storages of the database servers, the database servers storing identical blockchains, and the blockchains stored in the database servers form a blockchain system.

17. The non-transitory computer readable medium according to claim 16, wherein the operations further comprise:

in response to receiving a block sent by the other database servers in the distributed database system, querying, for each piece of transaction information recorded in the received block, a user public key of a user indicated by a user identifier in the transaction information in the distributed database system, and performing a signature verification on a SQL statement in the transaction information using the queried user public key and signature information in the transaction information; and concatenating, in response to the signature verification on the SQL statement in the each piece of transaction information recorded in the received block being successful, the received block to the local blockchain.

18. The non-transitory computer readable medium according to claim 17, wherein the preset consensus algorithm is a Byzantine fault tolerance consensus algorithm.

19. The non-transitory computer readable medium according to claim 18, wherein the distributed database system is a key-value distributed database system.

20. A distributed database system, comprising at least one database server, the database server comprising:

one or more processors; and a storage device, configured to store one or more programs, wherein the one or more programs, when executed by the one or more processors, cause the one or more processors to perform operations, the operations comprising:

in response to receiving a database operation request sent by a user using a terminal device, the database operation request comprising a Structured Query Language (SQL) statement, a user identifier and a user private key, determining whether a user indicated by the user identifier has a permission to operate data targeted by the SQL statement, wherein an operation indicated by the SQL statement refers to performing a querying operation, an adding operation, a modifying operation, or a deleting operation on the data targeted by the parsed SQL statement in the database;

performing, in response to determining the user having the permission, a digital signature on the SQL statement using the user private key to obtain signature information of the SQL statement, generating transaction information according to the SQL statement, the signature information of the SQL statement and the user identifier, and storing the generated transaction information into a local transaction information buffer pool; and in response to competing for a transaction information block recording permission using a preset consensus algorithm, selecting at least two pieces of transaction information from the local transaction information buffer pool to generate a block, parsing, by a SQL engine, a SQL statement in each piece of selected transaction information and executing an operation indicated by the parsed SQL statement after the block is generated, wherein the executing the operation indicated by the parsed SQL statement refers to performing the querying operation, the adding operation, the modifying operation, or the deleting operation on data targeted by the parsed SQL statement in the database, concatenating the generated block to a local blockchain, and broadcasting the generated block to other database servers in the distributed database system, for the other database servers to verify SQL statements in the at least two pieces of transaction information in the generated block and to concatenate the generated block to the blockchains of the other database servers, wherein the distributed database system comprising database servers, each of the database servers including a SQL engine, a block chain, and a distributed storage, data in the database is distributed in distributed storages of the database servers, the database servers storing identical blockchains, and the blockchains stored in the database servers form a blockchain system.

\* \* \* \* \*